(12) United States Patent
Ehring et al.

(10) Patent No.: US 11,493,081 B2
(45) Date of Patent: Nov. 8, 2022

(54) CONNECTION ROD

(71) Applicant: Airbus Operations GmbH, Hamburg (DE)

(72) Inventors: Benjamin Ehring, Hamburg (DE); Florian Lorenz, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 335 days.

(21) Appl. No.: 16/725,300

(22) Filed: Dec. 23, 2019

(65) Prior Publication Data

US 2020/0207459 A1    Jul. 2, 2020

(30) Foreign Application Priority Data

Dec. 31, 2018  (GB) ..................................... 1821307

(51) Int. Cl.
*F16C 7/06* (2006.01)
*B64C 3/18* (2006.01)

(52) U.S. Cl.
CPC . *F16C 7/06* (2013.01); *B64C 3/18* (2013.01)

(58) Field of Classification Search
CPC ..... F16C 7/06; F16C 7/02; B64C 3/18; B64C 7/00; B64C 3/38; F16B 11/008; F16F 2224/041; F16F 2224/046; F16F 9/30; F16F 9/303; F16F 5/00; F16F 15/023; F16F 9/0245; F16F 9/0254; F16F 9/56; F16F 2230/0041; F16F 2228/008; F16K 17/406; F05D 2240/90; F05D 2240/91; F05D 2230/60; B64D 27/26; B64D 2027/266; B64D 2027/262; B64D 2027/268; Y10T 403/47; Y10T 403/473

USPC ................................... 244/131; 188/269, 300
See application file for complete search history.

(56) References Cited

U.S. PATENT DOCUMENTS

| 3,786,695 A | 1/1974 | Barrett, Jr. |
| 2017/0082140 A1 | 3/2017 | Frankenstein et al. |
| 2017/0159700 A1 | 6/2017 | Stahl et al. |
| 2019/0203760 A1 | 7/2019 | Cladiere et al. |

FOREIGN PATENT DOCUMENTS

| CA | 3028890 A1 | 12/2017 |
| GB | 2247930 A | 3/1992 |

OTHER PUBLICATIONS

Great Britain Search Report; priority document.

*Primary Examiner* — Lindsay M Low
*Assistant Examiner* — Omar Morales
(74) *Attorney, Agent, or Firm* — Greer, Burns & Crain, Ltd.

(57) ABSTRACT

A connection rod comprising first and second connection elements. The first element comprises a shaft, a first connector at a shaft proximal end and a piercing body at a shaft distal end. The second element comprises a hollow casing with a fluid barrier therein, which, when intact, forms first and second reactive fluid material reservoirs, both within the casing. The second connection element comprises a second proximal end connector and a distal end inlet hole to the second reservoir. The piercing body fits within the casing and the shaft slidably engages the inlet hole such that the first element slides relative to the second element. The piercing body pierces the fluid barrier such that the reactive fluid materials mix between the reservoirs and react to form a reacted solid material restraining the piercing body within the casing to prevent relative sliding between the first and the second connection elements.

6 Claims, 5 Drawing Sheets

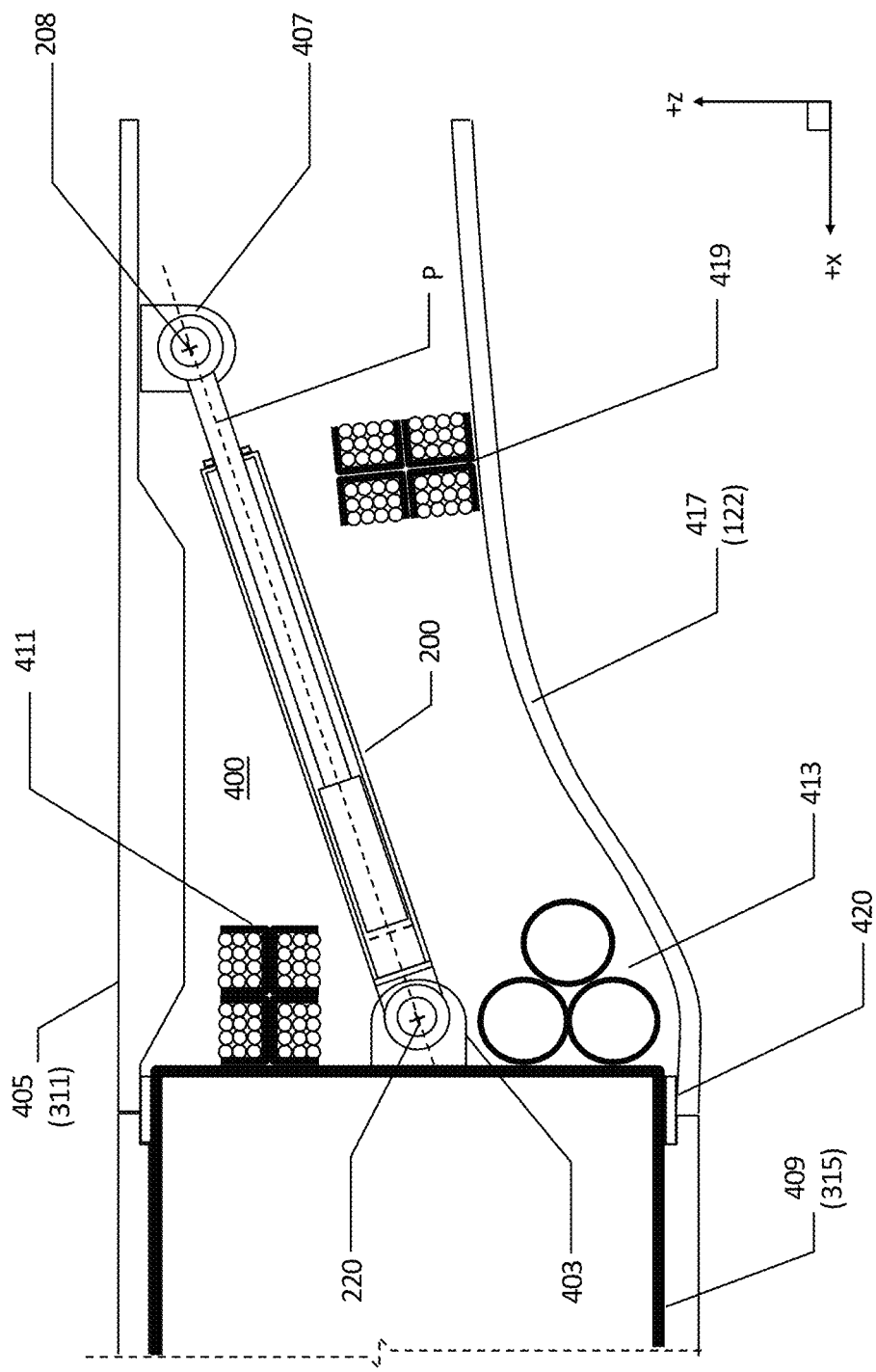

CONNECTION ROD

CROSS-REFERENCES TO RELATED APPLICATIONS

This application claims the benefit of the Great Britain patent application No. 1821307.4 filed on Dec. 31, 2018, the entire disclosures of which are incorporated herein by way of reference.

FIELD OF THE INVENTION

The present invention relates to a connection rod for connecting one or more aircraft components, an aircraft comprising a connection rod, and a method of installing a connection rod.

BACKGROUND OF THE INVENTION

It is known to assemble components on aircraft using threaded types of connection rods that are adjustable in length. Adjustability of the connection rod is required for installation of the connection rod between components in order to compensate for dimensional variations that may occur between the components. The adjustability therefore also enables different assemblies to meet specific dimensional requirements using the same connection rod design and is particularly useful for the assembly of large unitary components, where the manufacturing tolerances of each component tends to vary significantly. This is especially apparent when assembling non-metallic components, which are being used more often in the aerospace sector, however it is known to also be an issue when assembling metallic components to other metallic components or to non-metallic components.

FIG. 1 is a cross-section view of an aircraft assembly 100 in a wing taken through a plane xz, which is a plane parallel to a plane formed by the aircraft's longitudinal axis (x) and an orthogonal aircraft vertical axis (z). The assembly 100 comprises a threaded type of connection rod 101 according to the prior art that connects a plurality of components within the assembly 100.

The connection rod 101 comprises a casing 103, a first and a second adjustable connector 105 and 107 and a pair of corresponding end fittings 109, and a pair of check nuts 111. The casing 103 is cylindrical in cross-section (revolved about the longitudinal axis P), which is an axis that is coincident with a first connection point 112 and a second connection point 116. In the assembly 100 the connection rod 101 is also seen in section view where a longitudinal axis P of the connection rod also lies on the xz plane. The connection rod 101 is pivotally attached about the first connection point 112 to a first component 113 (formed as a wing fixed trailing edge upper panel) by a pin 114 to a first lug 115 formed by the first component 113, and is pivotally attached about the second connection point 116 to a second component 117 (formed as a wing rear spar), by a pin 114 to a second lug 119 formed by the second component 117. An installation position of a third component 122, formed as a wing trailing edge lower panel, is also shown in dotted lines. The third component 122 is configured to be fixed attached to the second component 117 at a left hand interface 123 and is positioned on an opposite side of the connection rod 101 to the first component 117. The components 113, 117 and 122 are structural components, meaning that their function is predominantly structural. When assembled, each adjustable connector 105 and 107 threadably engages a correspondingly threaded shaft 121 provided by each end fitting 109. By rotating each adjustable connector 105, 107 counter-clockwise on the corresponding threaded shaft 121, the overall length L of the connection rod 101 can be increased. By rotating each adjustable connector 105, 107 clockwise on the corresponding threaded shaft 121, the overall length L of the connection rod 101 can be decreased. Also threadably engaged to the threaded shaft 121 at each end is a check-nut 111. The function of the check-nut 111 is to prevent further rotation of the adjustable connector 105, 107 along the threaded shaft 121 by abutting it once the desired final length of the connection rod 101 is reached.

A primary function of the connection rod 101 as shown is to connect to, and transfer load between, a first and a second aircraft component 113, 117. These loads can be relatively high, therefore the prior art example shown is manufactured from high strength carbon steel.

One disadvantage of the threaded connection rods so far described relates to the maximum load capability of the connection rod 101, which is limited by the strength of engaging the threaded portion of the shaft and the adjustable connectors. Larger, stronger threads, with a coarser pitch, would increase the strength, however this would the adversely affect the degree of adjustability of the connection rod. This is not acceptable because the adjustability must be able to cater for the scale of the tolerance variation expected in the assembly, which is normally in increments of 0.01 mm. This tight tolerance is normal for aircraft due to precise aerodynamic shapes or assembly alignment required. The resulting design therefore is a compromise that is always limited in load capability of the connection rod itself or limited in the increments of its adjustability.

A further disadvantage relates to corrosion of the threaded portion of this type of connection rod. The connection rods are commonly used in internal and external areas of the aircraft that are exposed to corrosive substances such as water, salt, biological material, hydraulic fluid or de-icing fluid. Examples of such areas at the wing leading and trailing edges external to the aircraft or in the cabin seating or galley and toilet compartments internally. Taking into account these operating environments, the threaded shaft and threaded portion of the connectors are therefore normally corrosion proofed when they are manufactured, for example, they may receive an anodized or other protective coating. However, corrosion proofing of helical features on a threaded shaft is difficult to achieve due to the complex micro surface geometry to which the corrosion proofing must adhere. The corrosion proofing is also difficult to keep intact for threaded components that engage one another. Thus, the corrosion proofing for threaded types of adjustable connection rods is prone to damage and may often become compromised during the connection rods service life, resulting in thread corrosion that requires the corroded connection rod 101 to be taken out of service and repaired. This increases the cost of maintaining and operating the affected aircraft.

Further disadvantages relate to the costs of installing the threaded type of connection rods, in particular the costs associated with the tooling needed, the length of the installation procedure, and the costs of avoiding with or remediating inadvertent damage caused to surrounding system or structural components during installation. These costs account for a significant portion of the overall cost associated with using the threaded type of connection rod.

When installing a threaded type of connection rod, a mechanic needs to rotate and torque the casing or adjustable connector(s) in order to adjust the length of the connection rod and then to rotate and torque the check nuts to lock the connection rod at a desired length. This is normally achieved using torque wrench(es) and takes a significant amount of time and skill in order to achieve the correct installation length of the connection rod that is locked correctly. It also requires skill and time to avoid damage to adjacent structural components 113, 117 or system components such as electrical wiring 118 or ducting 120 also shown in FIG. 1. This is because the space adjacent to the connection rod in order to attach, rotate and detach one or more torque wrenches is limited. In some cases, the wrench may slip from engagement with the connection rod, resulting in inadvertent damage to adjacent components, or to the tooling itself.

Protective tooling such as soft padding is sometimes implemented to prevent inadvertent damage, but this increases costs and time taken to install the connection rod. It also may not avoid damage to the connection rod itself where it engages the torque wrench. In other cases, installation of the system components or other structural components, such as third structural component 122, is left until after the connection rod is installed in order to completely avoid being damaged, even though it would be less costly to install the components beforehand and even though it may leave some areas of the assembly unused in terms of supporting systems components. Another undesirable option taken by designers is to position the systems components further away from connections rods to avoid inadvertent damage as is the case in FIG. 1.

A further disadvantage of using threaded type of adjustable connection rods is that sometimes in spite of being desired, they are not a viable design solution because of the tooling space necessary to install them.

In view of the above it can be considered that objects of the present invention are to provide an improved connection rod for connecting aircraft components that is higher in strength, capable to compensate for similar or smaller assembly tolerances, and which is more versatile, and quicker and less costly to implement than the prior art solution.

SUMMARY OF THE INVENTION

An embodiment of the present invention provides a connection rod comprising a first connection element and a second connection element; wherein the first connection element is configured to attach to a first component and comprises a shaft, a first connector at a proximal end of the shaft and a piercing body at a distal end of the shaft; wherein the second connection element is configured to attach to a second component and comprises a hollow casing with a fluid barrier within the hollow casing, the fluid barrier being configured, when intact, to form a first fluid reservoir containing a first reactive fluid material within the hollow casing and a second fluid reservoir containing a second reactive fluid material within the hollow casing, wherein the second connection element further comprises a second connector at a proximal end and an inlet hole to the second fluid reservoir formed at a distal end to the hollow casing; wherein the piercing body is configured to fit within the hollow casing and the shaft is configured to slidably engage the inlet hole such that the first connection element can slide relative to the second connection element; wherein the piercing body is further configured to pierce the fluid barrier such that the reactive fluid materials may mix between the fluid reservoirs and react to form a reacted solid material that is configured to restrain the piercing body within the hollow casing such that the first connection element is unable to slide relative to the second connection element.

The connection rod according to the present invention is advantageous as it enables adjustability during installation up until the point that the reactive materials are reacted to a solid material, while at the same time the design also avoids the need for space adjacent to the connection rod for the operation of tooling to set the overall length of the connection rod. The connection rod according to the present invention is therefore advantageous in that it enables a decreased installation time and a decrease in the tooling required for installation. The connection rod according to the present invention furthermore significantly reduces the likelihood of inadvertent damage to the connection rod and any adjacent system or structural components because it does not require the use of tooling to adjust its length which in turn it enables quicker installation processes and avoids the necessity of protective tooling and the costs of inadvertent damage. Because the connection rod according to the present invention avoids the need for space adjacent to the connection rod for the operation of tooling, it may also be used in assemblies where the tooling space available is significantly less, therefore enabling the connection principle more versatile that may be used where previously is was not possible. The connection rod according to the present invention may therefore be more versatile than the prior art threaded type of connection rod.

Furthermore, the connection rod of the present invention does not have a threaded portion and instead its length is adjustable until the point where the reactive materials are mixed between the reservoirs and reacted to form a solid reacted material. Such a design mitigates significant disadvantages of the prior art type of threaded adjustable connection rod. Firstly, unlike the threaded type of connection rod, the connection rod of the present invention is not limited in the increments of its adjustability, because it does not have a threaded shaft with a pre-specified pitch value. This results in a design that is adjustable to significantly smaller tolerance values over a similar range, resulting in a connection rod that is much more versatile that can achieve smaller variations in the overall assembly dimensional tolerances.

Removing the need for a threaded shaft to achieve adjustability during installation also removes the need for the design compromise previously described. Accordingly, the strength of the connection rod of the present invention is optimized according to the compressive, tensile and shear strength of the solid reacted material that is subjected to loading over a much larger surface area defined by the interior surface of the hollow casing and the shaft and piercing body. The result is a connection rod of the present invention capable of sustaining significantly higher loading for a given size and weight, while at the same time not being limited in its increments of its adjustability during installation.

Furthermore, because the connection rod of the present invention does not have a threaded shaft that is difficult to corrosion proof, the resulting design is far less susceptible to corrosion. This reduces or avoids entirely the removal of the component for repair during its product lifecycle, which significantly reduces the cost of operating the aircraft in which it is used.

In a further embodiment of the present invention, the cross sectional area of the piercing body is larger than the cross sectional area of the shaft. Such a configuration introduces an edge feature between the shaft and the piercing body that promotes mixing of the reactive fluids when the fluid barrier is pierced such that the first connection body is slid relative to the second connection body. This may result in more optimal mixing and reaction of the reactive fluid materials, resulting in an improved material properties of the solid reacted material. Furthermore, it may result in a shorter gel time of the chemically reacting reactive fluid materials, which may, in turn, reduce the installation time and cost.

In another embodiment of the present invention, a gap is provided between the piercing body and the hollow casing measuring between 0.01 mm and 1 mm, which is advantageous in that this enables a connection rod to achieve higher loading to failure performance because it is configured to the maximum shear load to failure of the solid reacted material within the hollow casing.

In yet another embodiment of the present invention, an extension element may be provided between the second connector and the hollow casing that is configured to lengthen the second connection body. The extension element is advantageous in that it permits a different overall length to be achieved by the connection rod without modifying the remaining elements of its design.

In yet a further embodiment of the present invention, an aircraft assembly is provided comprising one or more component(s) connected by one or more connection rod(s) according to the present invention. An aircraft assembly comprising a connection rod according to the present invention is advantageous in that the space adjacent to the connection rod can be used to position other components because the space available is not required for tooling operation. Furthermore, the connection rod according to the present invention is less prone to corrosion damage, therefore such assemblies and the aircraft may cost less to operate. In yet a further embodiment an aircraft comprising an aircraft assembly further comprising a connection rod according to the present invention is provided.

In yet another embodiment of the present invention, a method of installing a connection rod according is provided comprising the steps of: sliding the first connection element and second connection element relative to one another such that the piercing body pierces the fluid barrier such that the reactive materials mix between the reservoirs and react; connecting the first connector to a first component; connecting the second connector to a second component; holding the first connection element and second connection element at a desired installed length relative to one another until the reactive materials form a solid reacted material within the hollow casing such that the first connection element is unable to slide relative to the second connection element and the connection rod. The method is advantageous in that it is quicker to implement than methods of the prior art and less prone to causing inadvertent damage.

In yet a further embodiment of the present invention, a further method step is provided comprising the step of cycling the position of the first connection member relative to the second connection member after the piercing body has pierced the fluid barrier in order to enhance mixing between the reservoirs of the reactive materials Enhancing the mixing of the reactive fluids in this way when the fluid barrier is pierced may result in more optimal mixing and reaction of the reactive fluid materials, resulting in an improved material properties of the reacted solid reacted material. Furthermore, it may result in a shorter gel time of the chemically reacting reactive fluid materials, which may in turn reduce the installation time and cost. Further advantages of the present invention will now become apparent from the detailed description with appropriate reference to the accompanying drawings.

BRIEF DESCRIPTION OF THE DRAWINGS

Embodiments of the present invention presented herein are described below with reference to the following drawings, in which:

FIG. 4 is a cross-section view of an aircraft assembly in a wing taken through a plane lying parallel to a plane formed by the aircraft longitudinal axis and orthogonal aircraft vertical axis, comprising a connection rod according to embodiments of the present invention that is connecting a plurality of components. In this example, the longitudinal axis lies on the plane also.

DETAILED DESCRIPTION OF THE PREFERRED EMBODIMENTS

Figure 1:
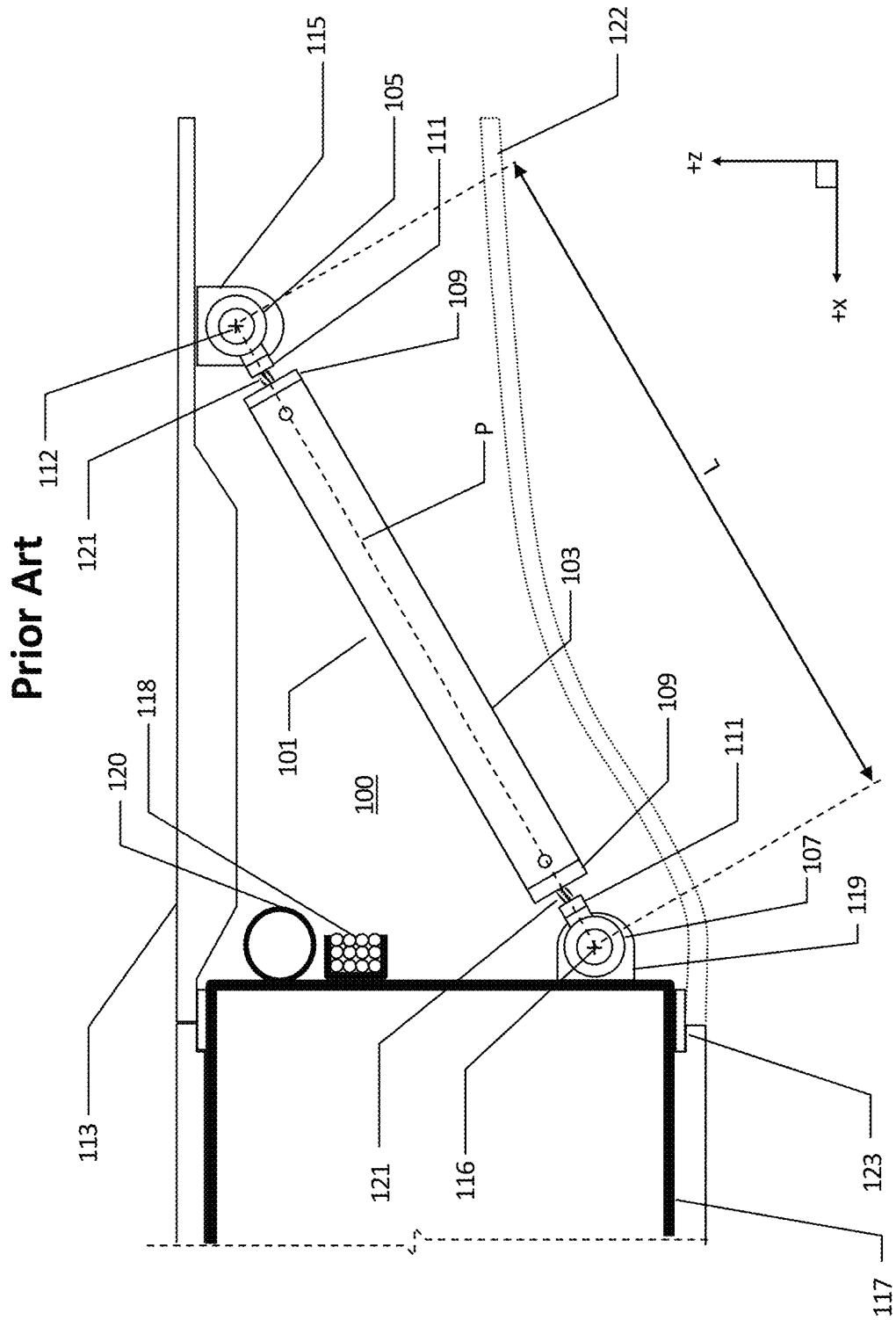
FIG. 1 is a cross-section view of a prior art aircraft assembly.

With reference to FIGS. 2 and 3a-3c, a connection rod 200 comprises a first connection element 201 and a second connection element 203. The primary functions of the connection rod 200 is the same as the prior art connection rod 101 of FIG. 1; that is, to connect components in an assembly and to provide adjustability during installation.

The first connection element 201 comprises a shaft 205 with a cross-sectional dimension D1 connected to a first connector 207 at a proximal end of the shaft 205. A distal end of the shaft 205 is connected to a piercing body 209 with a cross sectional dimension D2 at a distal end of the shaft 205. For the purpose of this description as a whole, a proximal end means the end of a connection element that is nearest to its point of attachment to a component, and a distal end means the end of a connection element that is furthest to its point of attachment to a component. The shaft 205 and piercing body 209 are cylindrical in cross-section revolved about the longitudinal axis P. In the present embodiment, the cross-sectional area of the piercing body 209 is larger than the cross sectional area of the shaft 205 such that a circumferential edge step 225 of dimension (D2−D1)/2 is provided.

The first connector 207 is configured to be attached to a first component 311 and is formed as a lug that is cylindrical in cross section (extending in a direction orthogonal to the longitudinal axis P) and has a pair of opposing planar faces, as shown. The first connector 207 forms a through hole whose centerpoint is concentric with a first connection point 208. The through hole is configured to receive an attachment pin (not shown) in an installed position 305 in order to pivotally attach the first connector 207 to a corresponding lug 309 formed by the first component 311.

The second connection element 203 comprises a hollow casing 211 with a cross section that is cylindrical about the longitudinal axis P and has an inner cross-section cross-sectional dimension D3. A proximal end of the second connection element 203 comprises a second connector 219 that is cylindrical in cross section in a direction orthogonal to the longitudinal axis P and has a pair of opposing planar faces, as shown Similar to the first connector 207, the second connector 219 forms a through hole that lies on the longitudinal axis P and that is coincident with a second connection point 220. The through hole is configured to receive a further attachment pin (not shown) in an installed position 305 in order to pivotally attach the second connector 219 to a corresponding lug 313 of a second component 315. In the pre-installed condition of FIG. 2, the connection rod 200 has a pre-installed length L that is measured along the longitudinal axis P between the first connection point 208 and the second connection point 220.

In the present embodiments, the first and second connection elements 201 and 203 are entirely formed from carbon steel, however it should be appreciated that the cross-section and material used to form the first and second connection elements 201, 203 may be different to take into account different loading and manufacturing requirements. For example, other metallic alloys such as titanium alloy or aluminum alloy may be used. In addition, different variations in cross-section and materials may be used. For example, a connection rod 200 that is substantially square, or triangular or elliptical in cross section may be used.

A fluid barrier 213 is provided within the hollow casing 211. The fluid barrier 213 is a circular plate that is rectangular in cross-section and formed from an aluminum material measuring between 0.02 mm and 0.1 mm. This material and dimension is chosen as it ruptures easily when in a direction along the longitudinal axis P. The fluid barrier 213 is adhered circumferentially to a circumferential inner surface 210 of the hollow casing 211 and is configured to establish and function as a rupturable membrane between a first fluid reservoir 215 containing a reactive fluid material 216 within the hollow casing 211 and a second fluid reservoir 217 within the hollow casing 211 containing a second reactive fluid material 218.

When the reactive fluid materials 216, 218 are exposed to one another, they chemically react so as to form a solid reacted material 307. This is only possible when the fluid barrier 213 is ruptured, i.e., brought from an intact state to a state where it is substantially not intact. The time for the chemical reaction to take place and the quality of the solid reacted material is dependent on the chemistry and quantities of the reactive materials and also the temperature at which the reaction takes place. It should be also be noted that the reaction rate may be tailored by the types, mass and ratios of reactive materials used, which will determine the volumetric size of the fluid reservoirs required. Furthermore, such tailoring will dictate what is referred to as the gel time of the reacting reactive materials, which is the time it takes for a mixture to transform to a gel or become so highly viscous that it can no longer be considered workable or able to be deformed. In the present example, the reactive fluid material 216 is a polyamine, whereas the further reactive fluid material 218 is an epoxide resin, however it should be appreciated that any suitable alternative combinations may be used. For example, for epoxy resin, a mixture of polyamines or an anhydride material rather than an amine material may be used. Other resins may also be used.

Other material types and thickness for the fluid barrier 213 may alternatively be used. The fluid barrier 213 may alternatively be formed from the same material as the hollow casing 211 and obtained by machining or casting the hollow casing 211 and fluid barrier 213 as a single part.

The hollow casing 211 further comprises an inlet hole 221 to the second fluid reservoir 217 that is formed at a distal end to the hollow casing 211. When the connection rod 200 is assembled and in the preinstalled condition of FIG. 2, the piercing body 209 and a portion of the shaft 205 are configured to fit within/be encapsulated by the second fluid reservoir 217 and the shaft 205 is also configured to slidably engage the inlet hole 221 such that the first connection element 201 can slide relative to the second connection element 203. In the present embodiment, a radial gap 227 dimension (determined by (D3−D2)/2) measuring 1 mm is provided between the piercing body 209 and casing 211. In the pre-installed condition, the second reactive fluid material 218 fills the radial gap 227. A resiliently deformable seal element 228 made from nitrile rubber is affixed external to the inlet hole 221 that is configured to prevent the second fluid material 218 from leaking out of the hollow casing 211, however a close tolerance fit between the inlet hole 221 and the shaft 205 may alternatively or in addition provide this sealing function.

It should be appreciated that the number of reservoirs, the number of fluid barriers and position of those fluid barriers and the configuration of the reactive materials may be modified. For example, the connection rod may be configured to have first, second, or more fluid barriers that define a first, second, third or more reactive fluid reservoirs containing varying or equal quantities of reactive fluid material or additional reactive materials. It should further be appreciated that the reservoirs 215, 217 may not extend for the full length of the hollow portion of the hollow casing 211.

The second connection element 203 further comprises a extension element 223 formed from high strength carbon that has the same outer dimension as the hollow casing 211 and which extends between the hollow casing 211 and the second connector 219. This extension element may be a separate connectable element between the second connector 219 and the hollow casing 211 or it may be integrally formed with one or both from the same material.

Figure 2:
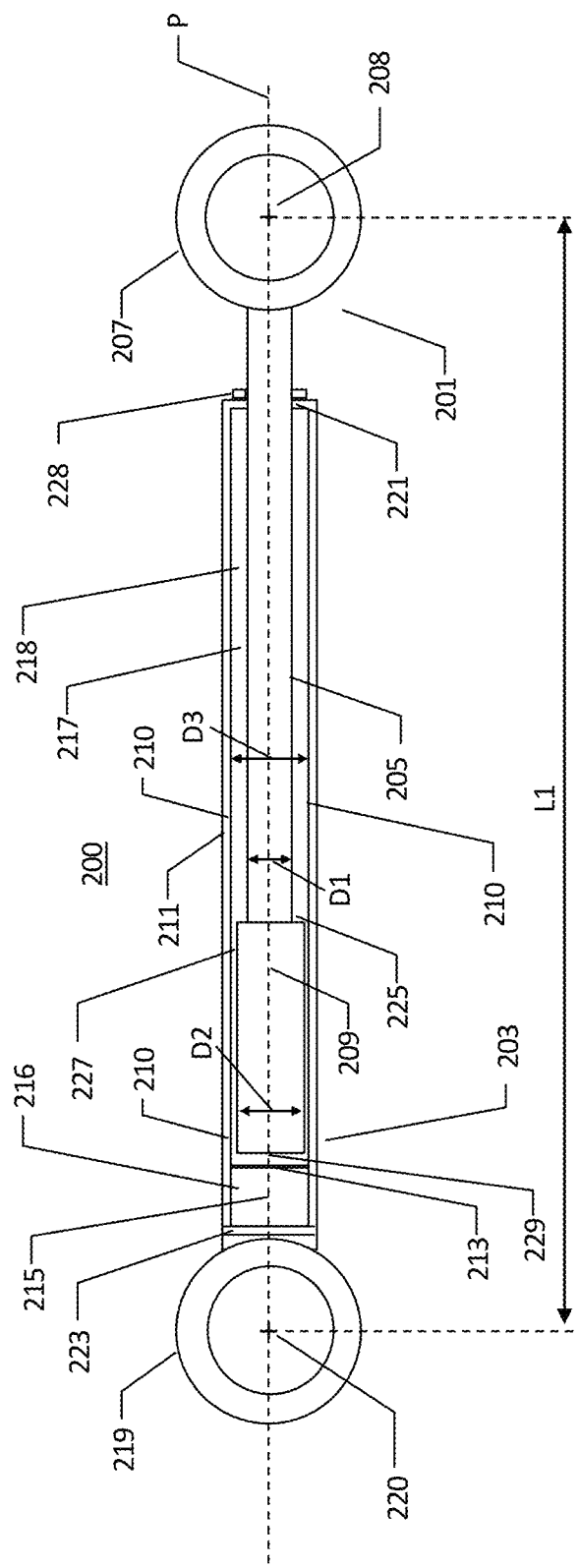
FIG. 2 is a cross-sectional side view of a connection rod, according to an embodiment of the present invention shown in a pre-installation condition. The sectional view is taken through a longitudinal axis of the connection rod.
Figure 3A:
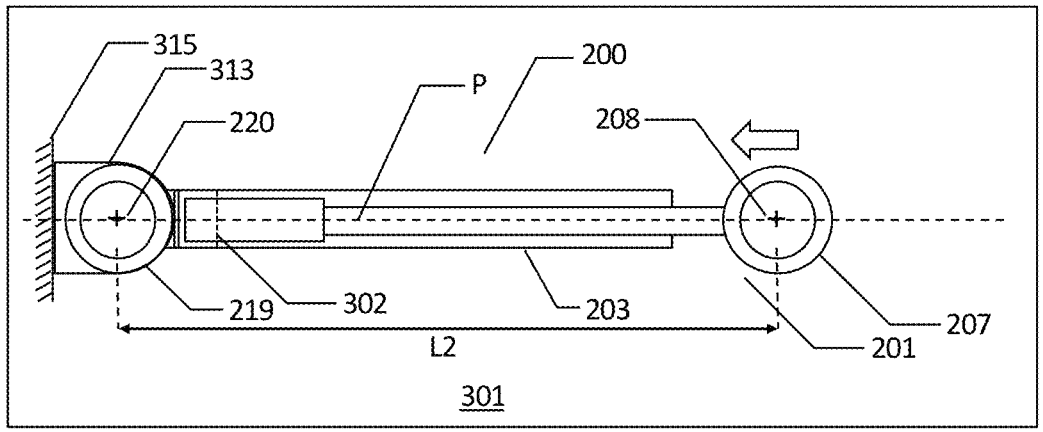
FIGS. 3a, 3b and 3c are a series of cross-sectional side views of the connection rod of FIG. 2 taken at different steps of an installation process until it is in an installed condition in an aircraft assembly according to embodiments of the present invention. The sectional views are common and taken through a longitudinal axis of the connection rod.

As shown in FIG. 3a, first installation step 301 of the connection rod 200 comprises obtaining a connection rod 200 of FIG. 2 and advancing the first connection element 201 towards the second connection element 203 from the pre-installed condition shown in FIG. 2, such that the length of the rod 200 reduces from L1 to L2 whereby a leading edge portion 229 of the piercing body 209 (which is driven by the shaft 205) pushes against and ruptures the fluid barrier 213. With the fluid barrier 213 ruptured (represented as a dotted line 302), the reactive fluid materials 216, 218 flow and mix between the fluid reservoirs 215, 217 and as a result they begin to chemically react or cure in the presence of one another. At the first installation step 301, the first connector 207 or second connector 219 may be pivotally connected to the first component 311 or the second component 315. The geometry of the leading edge portion 229 may be adapted to improve rupturability of the fluid barrier 213 for example it may be provided with an angled projection.

Figure 3B:
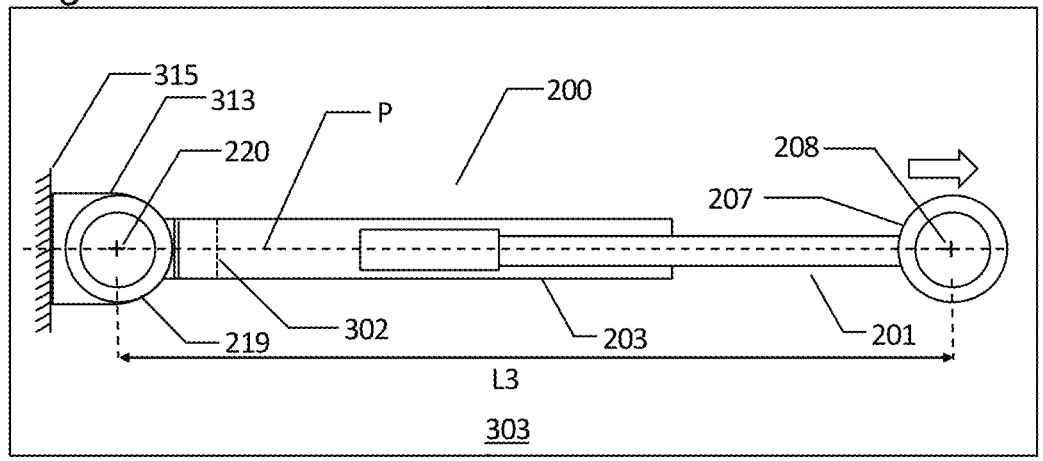

As shown in FIG. 3b, at an intermediary installation step 303, the position of the first connection element 201 relative to the second connection element 203 may be cycled one or more times between the position of the first installation step 301 and an extended position shown, where the length L3 of the connection rod 200 is greater than the length L2, where L3 is measured along the longitudinal axis P between the first connection point 208 and the second connection point 220 of the connection rod 200. In the extended position shown at step 30, the first connection element 201 is advanced away from the second connection element 203 until the piercing body 209 and shaft are encapsulated within the second fluid reservoir 217. The cycling as described may draw the first reactive fluid material 216 from the first fluid reservoir 215 into the further fluid reservoir 217 or vice versa and may enhance mixing between the reservoirs 215, 217 of the reactive materials 216, 218 as a result.

It should be appreciated that to achieve the same result the piercing body 209 may instead be cycled to be encapsulated to a lesser extent in the first fluid reservoir 215 or partially within the first and second fluid reservoirs 215, 217 to achieve the desired effect. Furthermore, the edge step 225 may cause turbulent flow of the reactive materials 216, 218 as a result of this cycling which may enhance further the mixing of the reactive materials 216, 218, particularly in proximity to the gap 227. The piercing body 209 may in addition or alternatively comprising fluid conduits between the leading edge 229 portion of the piercing body 209 and the shaft 205 to provide a further flow and mixing mechanism.

Figure 3C:
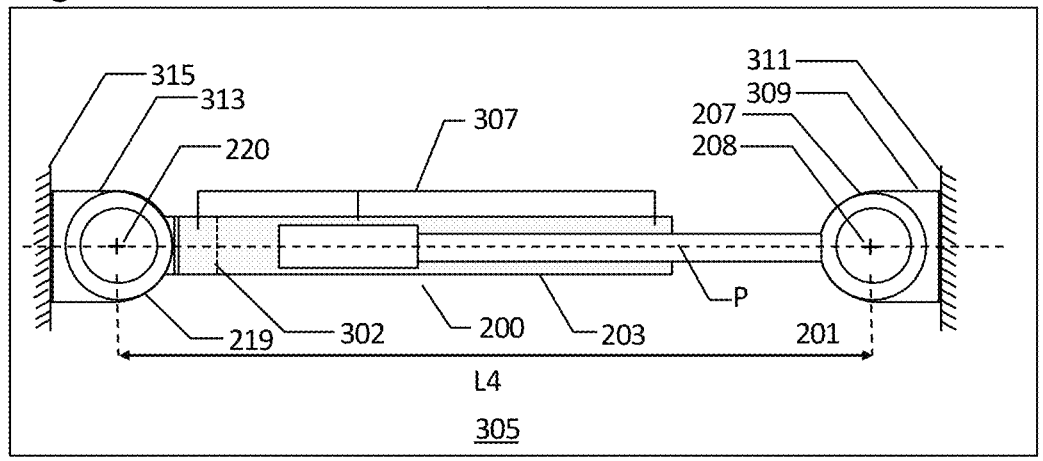

Before the gel time of the reacting reactive materials 216, 218 is reached, as shown in FIG. 3c, a final installation step 305 is performed, which comprises the task of adjusting the length of the connection rod 200 to the desired installed length L4 of the connection rod 200 by sliding the first connection element 201 either towards or away from the second connection member 203, and then holding the connection rod 200 at the desired installed length L4 until a reacted solid material 307 is formed from the chemical reaction of the reactive fluid materials 216, 218. The reacted solid material 307 occupies the reservoirs 215, 217 of the hollow casing 211 and adheres the surfaces of the piercing body 209 and shaft 205 to the interior surface of the hollow casing 211. This restrains movement of the piercing body 209 and shaft 205 within the hollow casing 211 such that the first connection element 201 is unable to slide relative to the second connection element 203 and the connection rod 200 length L4 between the first and second connection points 208, 220 becomes fixed and the connection rod 200 is no longer adjustable in length and at this point the connection rod 200 is considered to be in an installed condition. During the final installation step 305, the first connector 207 or second connector 219 may be pivotally connected to the aircraft component 311 or further aircraft component 315. Doing so may be preferred in instances where the aircraft components 311 and 315 are already held at their final assembly positions (for example in an assembly jig) and the adjustment of the length of the connection rod 200 to length L4 compensates completely for the tolerance variations.

With reference to FIG. 4, an aircraft assembly 400 is shown comprising a connection rod 200 according to the embodiments of FIGS. 2 and 3. The connection rod 200 is in an installed condition and connects a first component 311 (in the form of a wing fixed trailing edge upper panel 405 having the same dimension as the aircraft component 113 of FIG. 1) to a second component 315 (in the form of a wing rear spar 409 having the same dimension as the second component 117 of FIG. 1). As the installation of the connection rod 200 in FIG. 4 does not have a threaded shaft that requires tooling for installation and locking, the connection rod 200 can be installed within the assembly 400 much closer and easier to surrounding structural components 405, 409, 417 and system components such as wire raceway assemblies 411, 419 and a hydraulic pipe assembly 413. This is because the likelihood of inadvertent damage is far less. No longer constrained by tooling requirements, the third component 417 (in the form of a wing trailing edge lower panel having the same dimension and attachment as the third aircraft component 122 of FIG. 1) may be fixed attached to the assembly at interface 420 prior to the installation of the connection rod 200. As a result of the third component 417 being able to be installed before the connection rod 200 is attached, a much higher usage of the space available within the assembly 400 is possible because further system components 419 are integrated with the assembly 400 and supported by the third component 417 in close proximity to the connection rod 200. In addition, the position of the attachment point 220 of the connection rod 200 to the spar 409, for example, may be also adjusted so that a greater number of system components can be attached to the assembly 400. Such repositioning of the connection rod 200 reduces its overall dimensions, which may also provide a weight saving for the assembly.

Figure 5:
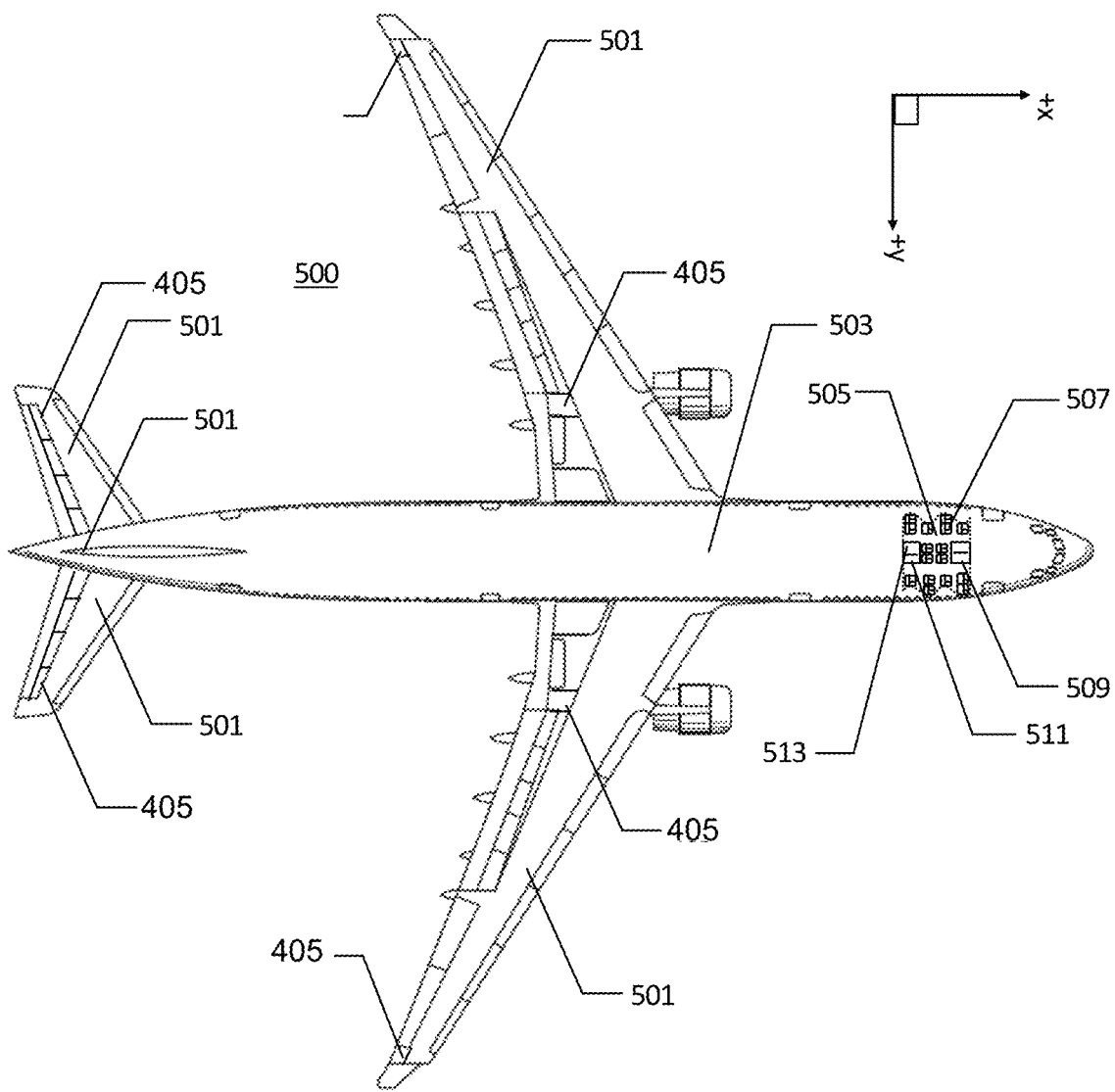
FIG. 5 is a plan view of an aircraft taken through a plane parallel to the aircraft longitudinal axis and orthogonal aircraft spanwise axis, comprising aircraft assemblies that comprise connection rods according to embodiments of the present invention.

With reference to FIG. 5, an aircraft 500 is shown with a plurality of wings 501 and a fuselage 503. Each wing 501 comprises exemplary assemblies that comprise fixed trailing edge upper panels 405 connected to wing rear spars (hidden) by connection rods 200 according to embodiments of the present invention. An interior portion of the fuselage 503 comprises a passenger cabin 505, a portion of which is revealed. The passenger cabin 505 comprises a plurality of exemplary seat and cabin monument component assemblies such as a passenger seat 507, hat-racks 509, a toilet 511 and a galley 513, which are connected to the fuselage structure by connection rods 200 according to embodiments of the present invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A connection rod comprising a first connection element and a second connection element;

wherein the first connection element is configured to attach to a first component and comprises a shaft, a first connector and a piercing body;

wherein the second connection element is configured to attach to a second component and comprises a hollow casing with a fluid barrier within the hollow casing, the fluid barrier being configured, when intact, to form a first fluid reservoir containing a first reactive fluid material within the hollow casing and a second fluid reservoir containing a second reactive fluid material within the hollow casing, wherein the second connection element further comprises a second connector and an inlet hole to the second fluid reservoir formed by the hollow casing;

wherein the piercing body is configured to fit within the hollow casing and the shaft is configured to slidably engage the inlet hole such that the first connection element can slide relative to the second connection element;

wherein the piercing body is further configured to pierce the fluid barrier such that the reactive fluid materials mix between the fluid reservoirs and react to form a reacted solid material that is configured to restrain the piercing body within the hollow casing such that the first connection element is thereafter unable to slide relative to the second connection element.

2. A connection rod according to claim 1, wherein the cross section area of the piercing body is larger than a cross sectional area of the shaft.

3. A connection rod according to claim 1, further comprising a gap between the piercing body and the hollow casing measuring less than or equal to 1 mm.

4. A connection rod according to claim 1, wherein the second connection element further comprises an extension element between the second connector and the hollow casing.

5. An aircraft assembly comprising one or more components connected by one or more connection rods according to claim 1.

6. An aircraft comprising a connection rod according to claim 1.

\* \* \* \* \*